(12) United States Patent
Dupuis et al.

(10) Patent No.: US 11,146,344 B2
(45) Date of Patent: Oct. 12, 2021

(54) METHOD AND APPARATUS FOR MONITORING A TELECOMMUNICATION NETWORK

(71) Applicant: Nokia Solutions and Networks OY, Espoo (FI)

(72) Inventors: Nicolas Dupuis, Chaudfontaine (BE); Axel Van Damme, Loyers (BE)

(73) Assignee: Nokia Solutions and Networks Oy, Espoo (FI)

( * ) Notice: Subject to any disclaimer, the term of this patent is extended or adjusted under 35 U.S.C. 154(b) by 354 days.

(21) Appl. No.: 16/259,069

(22) Filed: Jan. 28, 2019

(65) Prior Publication Data

US 2019/0260483 A1   Aug. 22, 2019

(30) Foreign Application Priority Data

Feb. 16, 2018  (EP) .................................. 18157119

(51) Int. Cl.
*H04B 17/309* (2015.01)
*G06N 3/08* (2006.01)
(Continued)

(52) U.S. Cl.
CPC ............. *H04B 17/309* (2015.01); *G06N 3/08* (2013.01); *H04L 41/0816* (2013.01);
(Continued)

(58) Field of Classification Search
CPC ........ H04B 1/309; H04B 3/54; H04B 17/309; G06N 3/08; H04L 41/0816; H04L 43/08;
(Continued)

(56) References Cited

U.S. PATENT DOCUMENTS

| 7,376,259 | B1 | 5/2008 | Dakshina-Murthy et al. |
| 10,051,423 | B1 * | 8/2018 | Feinmesser ........... H04W 4/023 |

(Continued)

FOREIGN PATENT DOCUMENTS

| CN | 106658590 A | 5/2017 |
| EP | 2712096 A1 | 3/2014 |

(Continued)

OTHER PUBLICATIONS

Japanese Office Action, for corresponding Japanese Patent Application No. 2019-13876 dated Mar. 17, 2020.
(Continued)

*Primary Examiner* — Kibrom T Hailu
(74) *Attorney, Agent, or Firm* — Harness, Dickey & Pierce, P.L.C.

(57) ABSTRACT

Embodiments relate to an apparatus for monitoring a telecommunication network including one or more telecommunication channels. The apparatus includes a processor configured after executing computer code to design a convolutional neural network configured for determining an impairment type of a telecommunication channel as a function of a channel frequency response of the telecommunication channel, by selecting at least one of a number of convolutional layers, a number of filters for respective convolutional layers, and/or a size of filters for respective convolutional layers; and train the convolutional neural network based on training data specifying, for respective telecommunication channels, a channel frequency response and an associated impairment type.

11 Claims, 3 Drawing Sheets

(51) Int. Cl.
*H04L 12/24* (2006.01)
*H04L 12/26* (2006.01)
*H04B 3/54* (2006.01)
*H04M 3/30* (2006.01)

(52) U.S. Cl.
CPC .............. *H04L 41/16* (2013.01); *H04L 43/08* (2013.01); *H04L 43/0811* (2013.01); *H04L 43/50* (2013.01); *H04B 3/54* (2013.01); *H04L 41/0654* (2013.01); *H04L 41/0677* (2013.01); *H04M 3/30* (2013.01)

(58) Field of Classification Search
CPC . H04L 43/0811; H04L 43/50; H04L 41/0654; H04L 41/0677; H04M 3/30
See application file for complete search history.

(56) References Cited

U.S. PATENT DOCUMENTS

| | | | | |
|---|---|---|---|---|
| 2010/0168208 | A1* | 7/2010 | McSwiggen ... | C12Y 207/11013 514/44 A |
| 2018/0367192 | A1* | 12/2018 | O'Shea ................ | H04B 7/0413 |
| 2019/0147713 | A1* | 5/2019 | Devison ............. | G08B 13/2491 340/552 |
| 2019/0220652 | A1* | 7/2019 | Li ........................ | G06N 3/0454 |
| 2020/0145661 | A1* | 5/2020 | Jeon ..................... | H04N 19/136 |
| 2020/0168208 | A1* | 5/2020 | Mitra .................... | G10L 15/075 |

FOREIGN PATENT DOCUMENTS

| | | |
|---|---|---|
| EP | 2843875 A1 | 3/2015 |
| EP | 3528432 A1 | 8/2019 |
| GB | 2532075 A | 5/2016 |

OTHER PUBLICATIONS

Ogg S. et al.: "Multiple fault diagnosis in analogue circuits using time domain response features and multilayer perceptions", IEE Proceedings: Circuits Devices And Syst, Institution Of Electrical Engineers, Stenvenage, GB, vol. 145, No. 4. pp. 213-218 Aug. 5, 1998.
European Search Report EPO Form 1507N, for European Application No. EP18157119 dated Jun. 18, 2018.
Office Action dated Jan. 12, 2021 in Chinese Application No. 201910115771.8.
CN Office Action dated May 25, 2021 in corresponding Chinese Application No. 201910115771.8.

* cited by examiner

METHOD AND APPARATUS FOR MONITORING A TELECOMMUNICATION NETWORK

CROSS-REFERENCE TO RELATED APPLICATIONS

This present application claims priority under 35 U.S.C. § 119 to European Patent Application No. 181571191, filed Feb. 16, 2018, in the European Patent Office, the entire contents of which are hereby incorporated by reference.

FIELD OF THE INVENTION

The present invention relates to the field of telecommunication. In particular, the present invention relates to a method and an apparatus for monitoring a telecommunication network.

BACKGROUND

A telecommunication channel such as a digital subscriber line (DSL) line, a power line communication channel, a wireless channel . . . may be affected by various impairments. Example of impairments that may affect a DSL line include a bridge tap, an impedance mismatch, a missing splitter, a misconnected splitter, capacitive coupling, resistive coupling, insulation fault . . . Impairments affect the quality of service, for example as speed reduction, erroneous service, connection losses. Accordingly, for a network operator, there is a desire to detect these impairments and to recognize them in order to act accordingly and efficiently.

It has been proposed to detect an impairment affecting a DSL line by analyzing the channel frequency response of the DSL line, typically express in dB and called Hlog. However, reliable and efficient impairment detection remains a challenge.

SUMMARY

It is thus an object of embodiments of the present invention to propose a method and an apparatus for monitoring a telecommunication network, which do not show the inherent shortcomings of the prior art.

Accordingly, embodiments relate to an apparatus for monitoring a telecommunication network comprising one or more telecommunication channels, the apparatus comprising means configured for:
designing a convolutional neural network configured for determining an impairment type of a telecommunication channel as a function of a channel frequency response of said telecommunication channel, by selecting at least one of a number of convolutional layers, a number of filters for respective convolutional layers, and/or a size of filters for respective convolutional layers,
training said convolutional neural network based on training data specifying, for respective telecommunication channels, a channel frequency response and an associated impairment type.

The apparatus may comprise at least one processor and at least one memory, the memory storing computer program code, the at least one memory and the computer program code configured for, with the at least one processor, cause the apparatus to at least perform:
designing a convolutional neural network configured for determining an impairment type of a telecommunication channel as a function of a channel frequency response of said telecommunication channel, by selecting at least one of a number of convolutional layers, a number of filters for respective convolutional layers, and/or a size of filters for respective convolutional layers,
training said convolutional neural network based on training data specifying, for respective telecommunication channels, a channel frequency response and an associated impairment type.

In some embodiments, designing a convolutional neural network comprises selecting at least one of said number of convolutional layers, said number of filters and/or said size of filters as a function of analysis results of channel frequency responses for a plurality of telecommunication channels.

In some embodiments, said means are configured for:
determining a fundamental frequency for respective channel frequency responses,
determining at least one fundamental frequency distribution based on the determined fundamental frequencies,
selecting said number of convolutional layers as a function of said at least one fundamental frequency distribution.

In some embodiments, said means are configured for:
determining a lag for respective channel frequency responses,
determining at least one lag distribution based on the determined fundamental frequencies,
selecting said filter size as a function of said at least one lag distribution.

In some embodiments, said means are configured for:
determining a YIN function of a channel frequency response,
determining said fundamental frequency and/or said lag based on said YIN function.

In some embodiments, the telecommunication channels comprise DSL lines, wherein said channel frequency response is a Hlog, and said convolutional neural network comprises a first convolutional layer comprising between 8 and 16 filters of size comprised between 4 and 12.

In some embodiments, the convolutional neural network comprises at least a second convolutional layer.

In some embodiments, said means are configured for determining, with said trained convolutional neural network, an impairment type associated with a telecommunication channel, as a function of a channel frequency response of said telecommunication channel.

In some embodiments, said means are configured for controlling a change of configuration of an access node and/or of a client device associated with said telecommunication channel, based on the detected impairment type.

Embodiments also relate to a method for monitoring a telecommunication network comprising one or more telecommunication channels, the method comprising:
designing a convolutional neural network configured for determining an impairment type of a telecommunication channel as a function of a channel frequency response of said telecommunication channel, by selecting at least one of a number of convolutional layers, a number of filters for respective convolutional layers, and/or a size of filters for respective convolutional layers,
training said convolutional neural network based on training data specifying, for respective telecommunication channels, a channel frequency response and an associated impairment type.

Embodiments also relate to a computer program comprising instructions for performing the method mentioned before when said instructions are executed by a computer. The computer program may be stored on a computer readable medium. The computer readable medium may be a non-transitory computer readable medium.

BRIEF DESCRIPTION OF THE DRAWINGS

The above and other objects and features of the invention will become more apparent and the invention itself will be best understood by referring to the following description of embodiments taken in conjunction with the accompanying drawings wherein.

DESCRIPTION OF EMBODIMENTS

Figure 1:
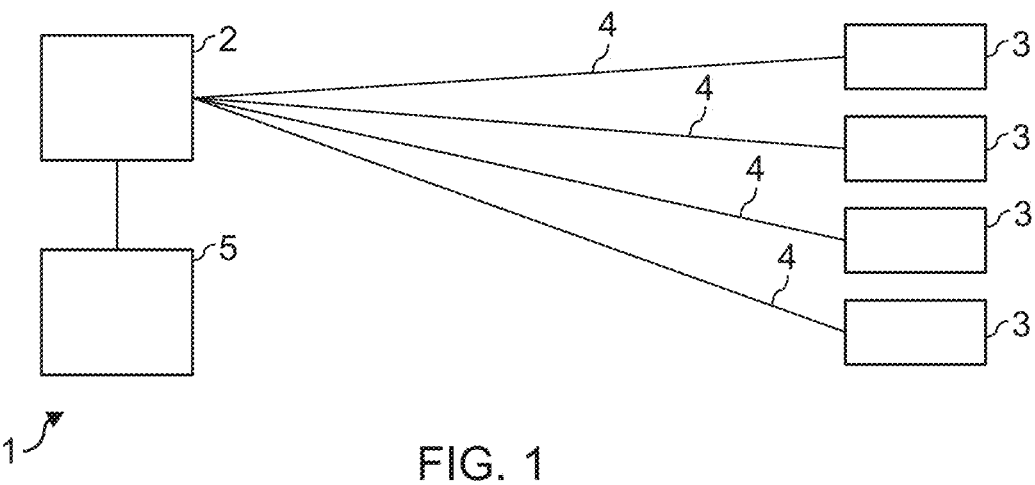
FIG. 1 is a block diagram of a telecommunication network.

FIG. 1 is a block diagram of a telecommunication network 1. The telecommunication network 1 comprises one or more access nodes 2 (only one of which is shown), a plurality of client devices 3, a plurality of telecommunication channel 4 and a monitoring device 5. An access node 2 comprises a plurality of ports to which respective client devices 3 are connected through a telecommunication channel 4.

In an embodiment, a telecommunication channel 4 is a DSL line. An access node 2 and a client device 3 are configured for communication through the DSL line using DSL technology, such as ADSL, VDSL2, G.FAST . . . . An access node 2 is for example a DSLAM and a client device 3 is for example a CPE, a DSL modem . . . .

In another embodiment, the telecommunication channel 4 is a power line configured for distribution of electrical power. An access node 2 and a client device 3 are configured for communication through the power line using Power Line Communication (PLC) technology.

In an embodiment, a telecommunication channel 4 is a wireless channel. An access node 2 and a client device 3 are configured for communication through the wireless channel using radio technology, for example based on a cellular radio standard. An access node 2 is for example a base station and a client device 3 is for example a mobile user terminal.

An access node 2 provides operational data describing the functioning of its ports (or in other words, of the connected telecommunication channel 4). The operational data specifies operational parameters, which include a channel frequency response for the respective telecommunication channels 4. Usually, these operational parameters are available for each client device 3 (each port or telecommunication channel 4) at regular time interval (e.g. daily, or every 15-min).

The monitoring device 5 is configured for obtaining operational data from the access nodes 2 and for detecting impairments affecting the telecommunication channels 4 based on said operational data. The functioning of the monitoring device 5 is described hereafter in more details with reference to FIGS. 2 to 8.

The channel frequency response (CFR) of a telecommunication channel 4 specifies an attenuation of the telecommunication channel, as a function of frequency. In the case of a DSL line, it is commonly expressed in dB and called Hlog.

A common format for specifying the Hlog is a curve in dB expressed over 512 tones or tone groups. This may result from aggregation of larger channel frequency response (e.g. specified on more tones). For example, in VDSL2 17 Mhz, a measured Hlog of 4096 tones may be aggregated by a ratio 1:8, providing a Hlog curve for 512 tones. Some embodiments use such common format of 512 tones. Other embodiments use other formats.

Figure 2:
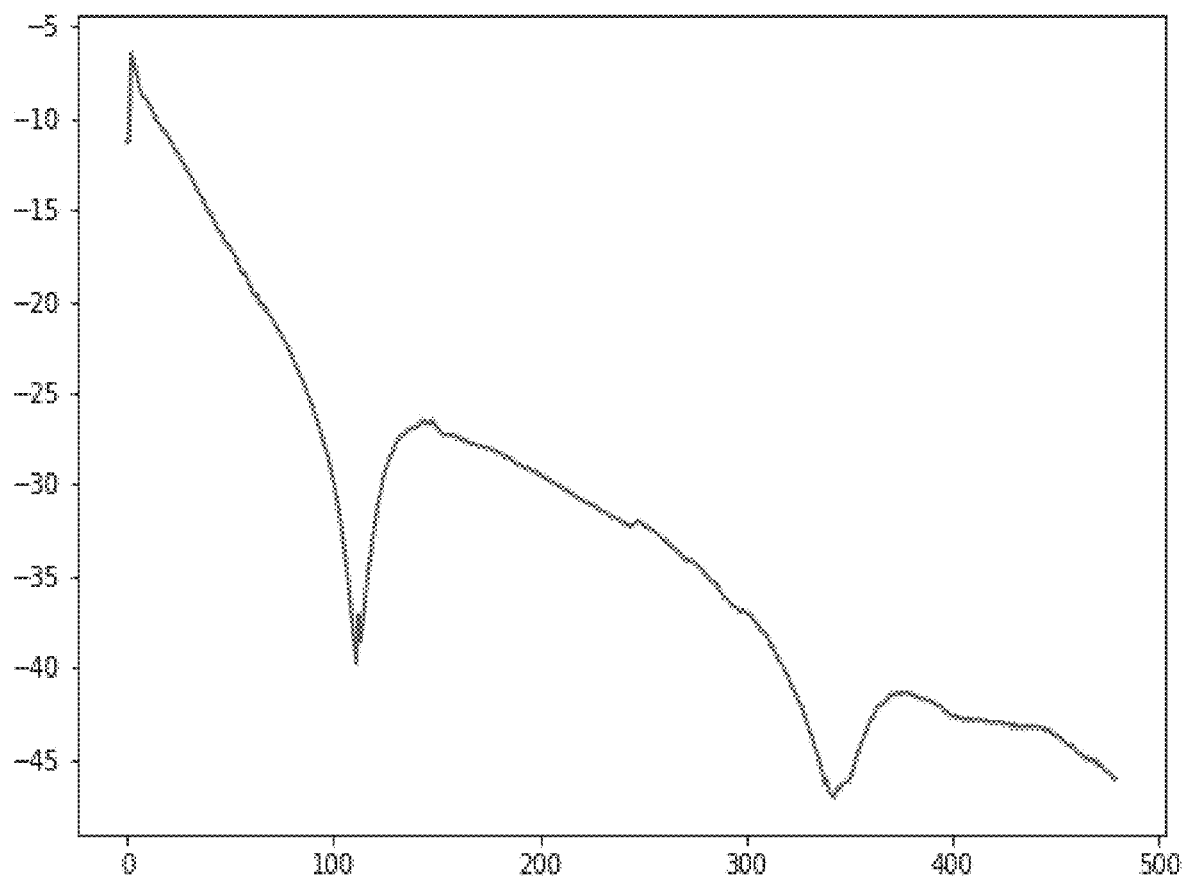
FIG. 2 is a graph of the channel frequency response of a telecommunication line affected by a bridge tap.

The channel frequency response is sensitive to the presence of any impairments or, in general, to the presence of any unexpected topological configurations. For example, in the presence of a "double path" or "bridge tap" on a DSL line, the Hlog presents some dips in its shape. FIG. 2 is a graph of a channel frequency response (CFR) of a DSL line affected by a bridge tap. In this example, only the first 480 tones (out of 512) are considered, to take into account that in the higher frequencies the signal-to-noise ratio may be low.

Figure 3:
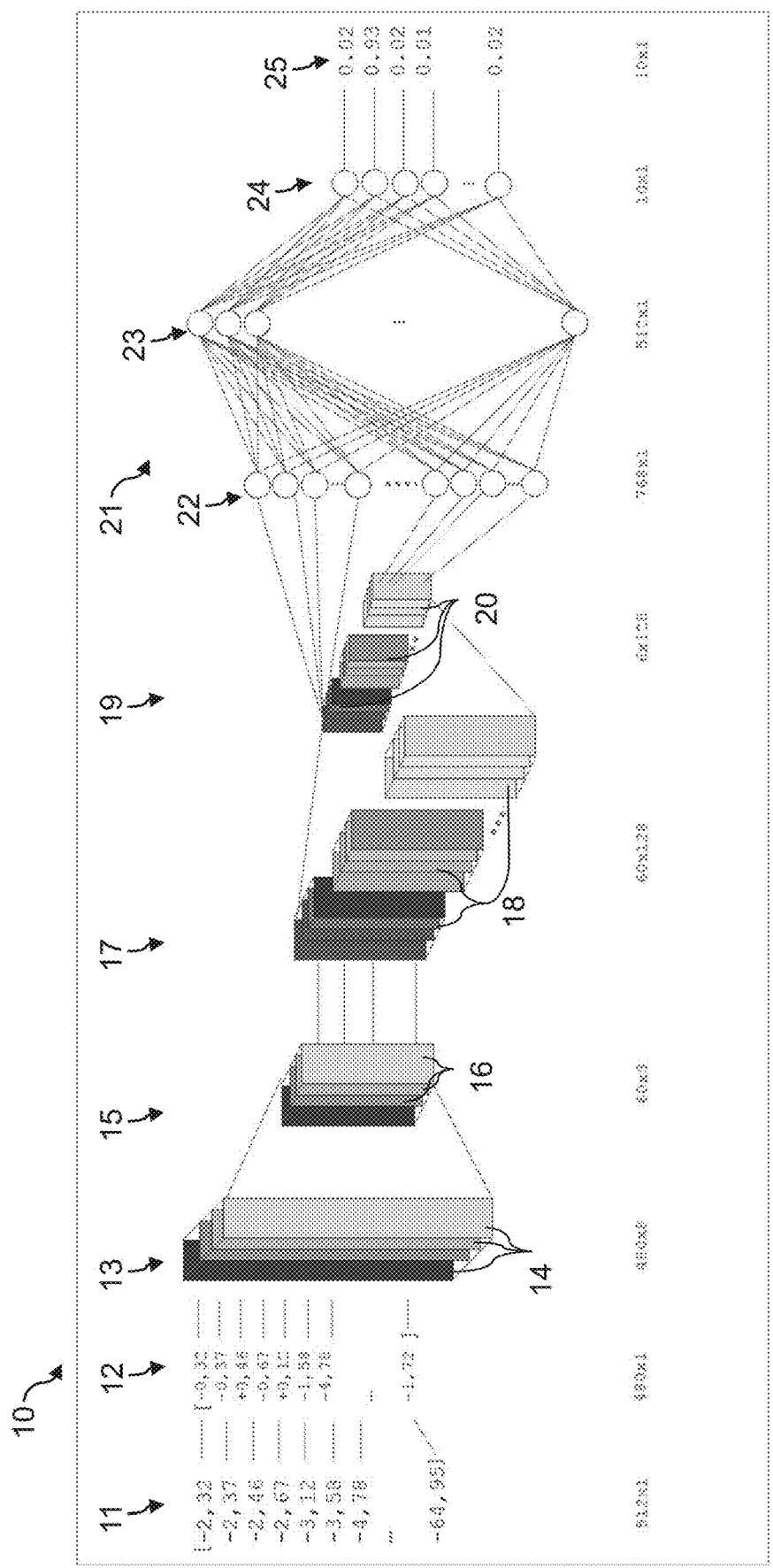
FIG. 3 is a block diagram of a convolutional neural network used for monitoring the telecommunication network of FIG. 1.

FIG. 3 is a block diagram of a convolutional neural network 10 (a CNN) used by the monitoring device 5. The convolutional neural network 10 is configured for determining an impairment type of a telecommunication channel 4 as a function of a channel frequency response of said telecommunication channel 4.

The input of the convolutional neural network 10 is a vector 12 which specifies the values of the channel frequency response for respective frequencies.

In some embodiments, the vector 12 of size N1 is determined by preprocessing a vector 11 of size N2>N1. The preprocessing may comprise tone aggregation and/or removing the higher tones which are more affected by noise. For example, the vector 11 is a vector of size N2=512 according to the Hlog format discussed before, and the vector 12 is determined by keeping the first N1=480 tones.

The convolutional neural network 10 comprises one or more sets of a convolution layer followed by a pooling layer. In the shown example, the convolutional neural network 10 comprises successively a first convolution layer 13 including filters 14, a first pooling layer 15 generating features vectors 16, a second convolution layer 17 including filters 18, a second pooling layer 19 generating features vectors 20, a fully connected neural network 21 including an input layer 22, one or more hidden layers 23 and an output layer 24.

As output, the convolutional neural network 10 returns a diagnosis of the channel frequency curve, preferably reported with a given confidence. For example, from a list of known impairments identifiable from the CFR as well as from the healthy category, the convolutional neural network 10 proposes a confidence value for each category. These are the confidence values. The highest one may be selected to propose the diagnosis. Accordingly, in some embodiments, the output vector 25 specifies, for respective impairment types, a probability or confidence. The higher value corresponds to the detected impairment type. This output vector 25 may be determined for example with a SoftMax layer as output layer 24.

Designing, training and use of the convolutional neural network 10 is performed by the monitoring device 5, as described in more detail now.

The convolutional neural network 10 is designed and dimensioned based on domain knowledge. The following discussion is based on the format of the CFR discussed previously (Hlog based on 512 tones). If another format of the CFR is used as input to the convolutional neural network 10, the design and dimensioning of the convolutional neural network 10 may be adapted correspondingly. For example, minor adaptations are made when only the first 480 tones are used for noise robustness for long loops.

The smaller patterns of the impairments we would like to track in our curve presents at least a shape spread at least over 8 tones. Making use of smaller convolutional kernels (i.e. filter/kernel size<<8), besides the fact that they will introduce a higher dependency over noise, will mainly not benefits from the ability to mitigate spatial neighbouring values provided by convolutional filtering (i.e. mitigating the neighbouring values into one more representative value). By contrast, using larger kernels (i.e. kernel/filter size>>8) not be able to extract such small patterns spread over around 8 tones. The selected filter size for the first convolutional layer 13 may therefore be between 4 and 12, with a preferred value of 8.

Another important aspect of convolutional filtering is the number of filters in use. From the machine learning best practice theory, lower is the complexity of a model, higher is its ability to generalize. As there is a direct relationship between the number of filters in use toward the number of features to classify and therefore toward complexity, the lower, the better. However, we would like anyway to extract enough features to be able to perform an accurate detection of the different impairments. There is a trade-off therefore to make. Here again, domain expertise will guide us. Indeed, from the different impairments, we can see that that are presence of shapes like dips, peaks, oscillations, sudden decrease/increase, smooth increase/decrease, etc. There is therefore between 8 and 16 fundamental shapes, but not much. Proposing more than 16 filters, as this is common in computer vision, is not relevant here. By contrast, proposing fewer filters (e.g. 4) will not allow to detect or make the distinction between some of the fundamental shapes, making impossible to detect or separate the different impairments. Accordingly, in some embodiments, the first convolutional layer 13 comprises between 8 and 16 (included) filters 14.

Another major aspect of the patterns resides in the repetition of the fundamental shape. Depending on the nature of the impairments, there are several occurrences of the fundamental signature over the curve. In the case of a bridge-tap, longer is such tap, more repetitive occurrences will be present. In that case too, the position of the first dip will move toward the left moreover. There is therefore a need for capturing this repetitive behaviour of the fundamental signature. To do this, from a neural network perspective, there is a need for introducing another "layer". This extra layer will mitigate the presence of the fundamental shape (extracted by the previous convolutional layer, as explained before) potentially with another of its occurrence in its neighbourhood. Again, for the second convolutional layer 17, performing some filtering, the size and number of filters 18 will be guided by domain expertise. Similar considerations as for the first layer are still valid (e.g. a lower number of filters performs better, but there is a required amount to be able to capture all the different repetitive aspects).

Before proposing some size, the reader should notice that the feature extracted by the first convolutional layer 13 are not fed as such to the second convolutional layer 17. In between, there is a down sampling step, called pooling layer 15, which is performed. This comes from the fact that, as convolution mitigate neighbouring values, there is a redundancy of information between neighbouring outputs. There is therefore at this stage opportunity to reduce the model complexity. For example, the pooling layer 15 performs a max pooling (down sampling) by a 1:8 ratio, and the CFR gets transformed into different feature vectors 16 of size 64. The presence of the extracted kernel shapes resides therefore in highervalues within the 64 vectors. Knowing they can be distant, having convolution with filters 18 of size ranging between 8 and 16 is preferred. As for the previous layer, here again, as the repetitive aspects may be different, even per class of impairments (e.g. different types of repetition expected for the bridge tap itself), the number of filters at the second convolutional layer 17 may be chosen to be 16. It is higher due to the expected different cases of potential repetition. After another max pooling step performed by the pooling layer 19 with a 1:8 ratio, there is a sequence of 8 values produced by each filter of the second convolutional layer 20. After a flattening of the different sequences of size=8, there is therefore a feature map of size:

$$\text{Size(Fc\_map)} = \text{size(input)} * M/P1 * N/P2$$
$$= 512 * 8/8 * 16/8$$
$$= 1024$$

where M and N and respectively the number of filters in the first and second convolutional layer, and P1 and P2 respectively the pooling ratio in layer 1 and layer 2.

The classification stage is also made of neurons and belong to the same convolutional neural network 10. Compared to the convolutional part, the purpose is to establish a relationship between all the features and the impairments. At that stage, there is therefore no convolutional filtering nor pooling, but only connections between all neurons toward other layer neurons. For example, the classification is performed by the fully connected neural network 21. Beside these aspects, usually the major difference between the neuronal model proposed for feature extraction and for classification resides in the difference between the activation function. Typically, Rectified Linear Unit (ReLU) activation functions are used to perform convolution using neurons (which is a linear process), while hyperbolic tangent activation functions are preferred for classification. This is the preferred option. The main tuning factor here is the number of neurons in-use. Between the number of feature and the number of output classes, an amount of 512 neurons may be chosen. From a domain expertise, there is no valid reason at this stage to introduce extra complexity in the model by adding extra layers. A single hidden layer 23 is therefore chosen, and will be finally connected to the output layer 24 which is only performing a SoftMax operation in order to normalize all the output confidence values (i.e. sum of all the confidence value=1).

This domain-aware design and dimensioning of the convolutional neural network 10 is performed by the monitoring device 5, by automatically selecting at least one of the number of convolutional layers, the number of filters and/or the size of filters as a function of analysis results of channel frequency responses for a plurality of telecommunication channels 4.

Figure 4:
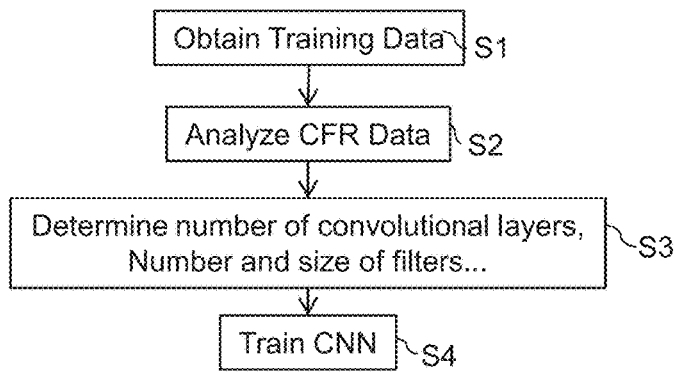
FIG. 4 is a flowchart of steps of a method for monitoring the telecommunication network of FIG. 1, FIGS. 5 and 6 are graphs of variational estimators and related distributions.
Figure 7:
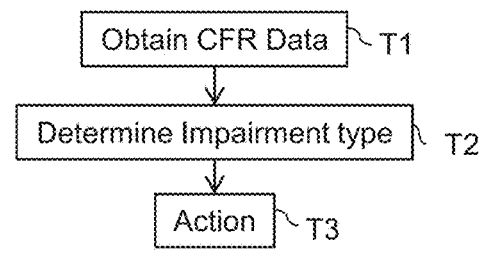
FIG. 7 is a flowchart of steps of a method for monitoring the telecommunication network of FIG. 1.

FIGS. 4 and 7 are flowcharts of a method for monitoring the telecommunication network 1, executed by the monitoring device 5. More specifically, FIG. 4 relates to design and training of the convolutional neural network 10, and FIG. 7 relates to impairment detection by using the trained convolutional neural network 10.

The monitoring device 5 obtains training data for the convolutional neural network 10 (Step S1). The training data comprise CFR data specifying the channel frequency response of respective telecommunication lines 4, and label data specifying impairment types associated with respective telecommunication lines 4.

For example, the monitoring device 5 receives CFR curves from one or more access nodes 2 and/or from a database wherein a network operator has stored CFR curves. The monitoring device 5 may apply a preprocessing to the CFR curves, for example for conversion to the format used by the convolutional neural network 10 if necessary.

The label data specifies labels associated with respective telecommunication lines 4. The label data may specify a label for each telecommunication line for which the CFR data specify a CFR curve, or for only a portion of these telecommunication lines 4. A label specifies an impairment type associated with a CFR curves. This may include a healthy category and a predetermined number of known impairments that may affect a telecommunication channel 4. In the case of a DSL line, examples of impairments include a bridge tap, an impedance mismatch, a missing splitter, a misconnected splitter, capacitive coupling, resistive coupling, insulation fault . . . . The label data may be obtained for example from a database wherein troubleshooting data determined by an expert with the use of CFR analysis tools has been stored.

Then, the monitoring device 5 analyzes the CFR data (Step S2) to determine analysis results, and design the convolutional neural network 10 based on the analysis results (Step S3). Designing the convolutional neural network 10 may comprise selecting at least one of the number of convolutional layers, the number of filters and/or the size of filters for respective convolutional layers. Designing the convolutional neural network 10 may also comprise selecting the number of hidden layers, number of neurons and type of activation function for the fully connected neural network 21. More generally, any hyperparameters of the convolutional neural network 10 may be determined at this step, based on analysis results of channel frequency responses for a plurality of telecommunication channels. However, some (hyper-)parameters, including some of those mentioned before, may be predetermined.

As seen previously, most of the CNN tuning process resides in the comprehension of the patterns to track in order to adapt the hyper-parameters (filter size, filter numbers, number of layers . . . ) at best. Moreover, these different number of hyper-parameters are finally related to "types of variations" as well as to the "combination of variations" occurring in the input curves (Hlog). As such, and knowing the patterns to track, the CNN design process can be assisted by classical variational estimators in order to adapt these hyper-parameters to those variations.

Example of suitable variational estimators are those used in audio processing, for instance for tracking the fundamental frequency or "pitch". Basic ones are based on Fourier transform, later-on tracking the highest peak in the frequency graph (in our case, this means tracking the frequency of repetitions appearing in the Hlog graph). Auto-correlation may also be suitable. Another example are the YIN estimators, tracking the fundamental frequency/patterns of a signal however being robust to amplitude modulation and progressive offset (like the decreasing behavior of Hlog) may work better.

Such variational estimators allow to track, for each Hlog:
1. if there is a repetitive behavior,
2. if so, which is the fundamental frequency/lag of/between the repetitions.

Applied to the design process, the first point gives indications about the necessity to add extra hidden layers to the feature extraction stage of the convolutional neural network 10. While the second aspect rather gives indications on the size of the smallest kernel or filter.

Figure 5:
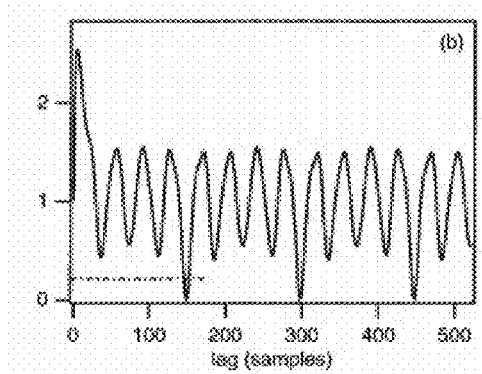

FIG. 5 is a graph of the Yin function of a realistic CFR curve presenting a repetitive pattern. By tracking respectively, the minimum value itself and the position of the first lower value within a tolerance, indications about the presence of repetition as well as the lag between similar patterns can be obtained. Indeed, as seen in FIG. 5, the deepness of the minimum of a YIN curve indicate about the level of repetition occurring on an input curve, whatever the envelope variations as well as the (varying) offset (i.e. the absolute amplitude of the curve may be decreasing, as for the Hlog). Tracking such value indicate therefore about the degree of repetition present on the curve. By contrast, checking the first position (lag) of the minima, indicates about the distance between two patterns.

Therefore, in some embodiments, at step S2, the monitoring device 5 determines the YIN functions for the respective CFR curves of the CFR data, and, for the respective YIN functions, determines the minimum value and lag (first position of a minima). The monitoring device 5 determines distributions for the minimal value and for the lag, for example by computing, for respective categories (corresponding to the labels or impairment types), a lag histogram and a minimal value histogram. This is illustrated on FIG. 6.

Then, at step S3, the monitoring device 5 determines a kernel size (filter size) and a number of convolutional layers as a function of the distributions:
  from the lag distributions, the required minimum kernel size to be able to detect the fundamental pattern in each category may be determined. This is for instance made by estimating the lag value at the percentile 10 of each distribution, and taking for instance the average/median or minimum value over the different class-distributions.
  from the value distributions, if the value at percentile 50 is low enough (below a threshold) at least for a class of impairment, there is a necessity to add an extra convolutional layer (to perform the combination), at least to detect the current type of impairment.

The monitoring device 5 trains the convolutional neural network 10 based on the training data (Step S4). This may include determining filter parameters, weights . . . .

The trained convolutional neural network 10 may be used by the monitoring device 5 to detect an impairment on a telecommunication channel 4.

The monitoring device 5 obtains CFR data specifying the channel frequency response of a telecommunication channel 4 (Step T1). In some embodiments, the obtained channel frequency response is in the appropriate input format of the convolutional neural network 10. In other embodiments, the monitoring device 5 pre-processes the channel frequency response for conversion to the appropriate input format.

Then, the monitoring device 5 determines an impairment type associated with the telecommunication channel 4, based on the obtained channel frequency response and trained convolutional neural network 10 (Step T2). As described with reference to FIG. 3, this may include selecting the category with the highest confidence in the output vector 25.

The monitoring device 5 may perform an action associated with the detected impairment type (Step T3). This may include at least one of:

Controlling the storing and/or displaying on a user interface of the detected impairment type, Controlling the access node 2 and/or client device 3 associated with the telecommunication channel 4 to change configuration parameters, for example by sending a configuration message, Sending a request for a field maintenance intervention on the access node 2, the client device 3 and/or the telecommunication channel 4, Generating an alarm, In the telecommunication network 1, a convolutional neural network 10 is used for detecting an impairment type associated with a telecommunication channel 4, out of a plurality of possible impairment types. Since the different possible impairment types are considered by the same convolutional neural network 10 and the most probable is selected, the risk of inaccurate diagnosis and false positive is reduced or avoided. The presence of high confidence concurrent/opposite diagnosis may be or avoided.

Moreover, the design of the convolutional neural network 10 allows to generalize the detection capacities for telecommunication channels 4 different from the ones present in the training data. For example, the monitoring device 5, with the trained convolutional neural network 10, may be used with telecommunication line having different medium, topology, cable gauge, insulator . . . .

Also, the convolutional neural network 10 may be used for detecting any impairment types for which labelled training data is available. Accordingly, the detection coverage may be improved.

Also, since the topology and/or one or more hyper-parameters of the convolutional neural network 10 are automatically selected by the monitoring device 5 based on domain-aware knowledge, accuracy is improved, in particular by comparison with a domain-unaware approach, wherein different combinations of hyper-parameters would be tested and validated with cross-validation data.

Figure 8:
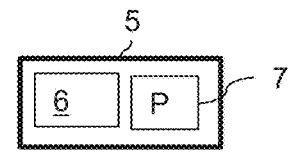
FIG. 8 is structural view of a monitoring device.
Figure 6:
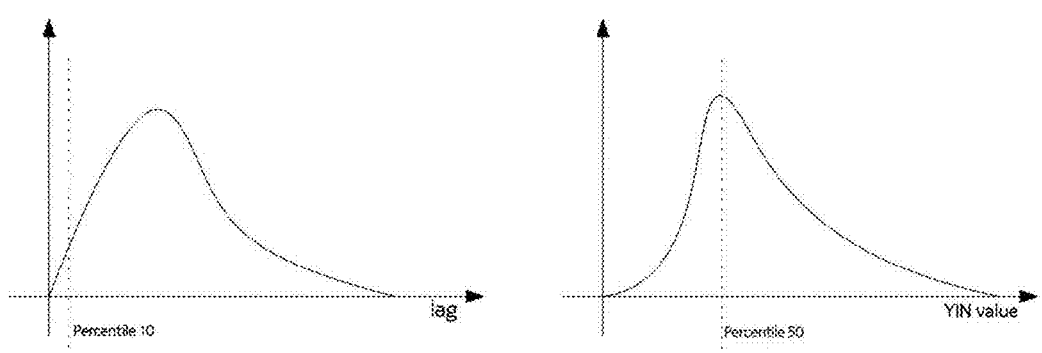

FIG. 8 is a structural view of the monitoring device 5, which comprises at least one processor 6 and at least one memory 7. The memory 7 stores computer program code P. The at least one memory 7 and the computer program code are configured for, with the at least one processor 6, cause the monitoring device to at least perform the method described above with reference to FIGS. 1 to 7.

It is to be remarked that the functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared, for example in a cloud computing architecture. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Their function may be carried out through the operation of program logic, through dedicated logic, through the interaction of program control and dedicated logic, or even manually, the particular technique being selectable by the implementer as more specifically understood from the context.

It should be further appreciated by those skilled in the art that any block diagrams herein represent conceptual views of illustrative circuitry embodying the principles of the invention. Similarly, it will be appreciated that any flow charts represent various processes which may be substantially represented in computer readable medium and so executed by a computer or processor, whether or not such computer or processor is explicitly shown.

While the principles of the invention have been described above in connection with specific embodiments, it is to be clearly understood that this description is made only by way of example and not as a limitation on the scope of the invention, as defined in the appended claims.

The invention claimed is:

1. An apparatus for monitoring a telecommunication network including one or more telecommunication channels, the apparatus comprising:
   a memory storing computer code; and
   at least one processor configured to execute the computer code which configures the at least one processor to:
   design a convolutional neural network configured to determine an impairment type of at least one telecommunication channel of the one or more telecommunication channels as a function of a channel frequency response of the at least one telecommunication channel, the designing the convolutional neural network including selecting at least one of a number of convolutional layers, a number of filters for respective convolutional layers, and/or a size of filters for the respective convolutional layers, and
   train the convolutional neural network based on training data specifying, for one or more respective telecommunication channels, a channel frequency response and an associated impairment type.

2. The apparatus according to claim 1, wherein
   the one or more telecommunication channels are a plurality of telecommunication channels; and
   the designing the convolutional neural network comprises:
   selecting at least one of the number of convolutional layers, the number of filters and/or the size of filters as a function of analysis results of channel frequency responses for the plurality of telecommunication channels.

3. The apparatus according to claim 2, wherein the computer code further configures the at least one processor to:
   determine a fundamental frequency for respective channel frequency responses,
   determine at least one fundamental frequency distribution based on the determined fundamental frequencies, and
   select the number of convolutional layers as a function of the at least one fundamental frequency distribution.

4. The apparatus according to claim 3, wherein the computer code further configures the at least one processor to:
   determine a lag for respective channel frequency responses,
   determine at least one lag distribution based on the determined fundamental frequencies, and
   select the filter size as a function of the at least one lag distribution.

5. The apparatus according to claim 4, wherein the computer code further configures the at least one processor to:

determine a YIN function of a channel frequency response; and determine the fundamental frequency and/or the lag based on the YIN function.

6. The apparatus according to claim 1, wherein the one or more telecommunication channels comprises at least one digital subscriber line (DSL) line;

the channel frequency response is a Hlog; and the convolutional neural network comprises a first convolutional layer comprising between 8 and 16 filters of size comprised between 4 and 12.

7. The apparatus according to claim 6, wherein the convolutional neural network comprises at least a second convolutional layer.

8. The apparatus according to claim 1, wherein the computer code further configures the at least one processor to determine, with the trained convolutional neural network, an impairment type associated with a telecommunication channel, as a function of a channel frequency response of the telecommunication channel.

9. The apparatus according to claim 8, wherein the computer code further configures the at least one processor to:

control a change of configuration of an access node and/or of a client device associated with the telecommunication channel, based on the determined impairment type.

10. A method for monitoring a telecommunication network including one or more telecommunication channels, the method comprising:

designing a convolutional neural network configured for determining an impairment type of at least one telecommunication channel of the one or more telecommunication channels as a function of a channel frequency response of the at least one telecommunication channel, the designing the convolutional neural network including selecting at least one of a number of convolutional layers, a number of filters for respective convolutional layers, and/or a size of filters for the respective convolutional layers, and training the convolutional neural network based on training data specifying, for one or more respective telecommunication channels, a channel frequency response and an associated impairment type.

11. A non-transitory computer-readable medium storing computer-executable instructions which when executed by a computer causes the computer to perform the method of claim 10.

* * * * *